3,847,918
S-TRIAZOLO[1,5-c]QUINAZOLIN-7(6H)-ONES
Faizulla G. Kathawala, West Orange, N.J., assignor to
Sandoz-Wander, Inc., Hanover, N.J.
No Drawing. Filed May 17, 1973, Ser. No. 361,270
Int. Cl. C07d 51/42
U.S. Cl. 260—256.4 F        8 Claims

ABSTRACT OF THE DISCLOSURE

S-triazolo[1,5-c]quinazolin-7(6H)-ones, e.g. 4a,5-dihydro-4a-methyl-pyrrolo-[1,2-a]-s-triazolo[1,5 - c] quinazolin-7(6H)-one are useful as anti-inflammatories.

---

This invention relates to s-triazolo[1,5-c]-quinazolin-7(6H)-one derivatives, acid addition salts thereof, intermediates and processes for their preparation and their use as anti-inflammatories.

The compounds of this invention may be represented by the following structural formula:

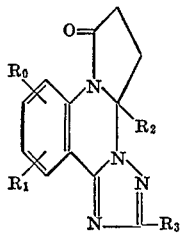

where $R_0$ and $R_1$ each independently represent hydrogen, halo having an atomic weight of 19 to 36, lower alkyl i.e. alkyl of 1 to 4 carbon atoms, e.g. methyl, ethyl and the like, lower alkoxy, i.e. alkoxy of 1 to 4 carbon atoms, e.g. methoxy, ethoxy, and the like, nitro or trifluoromethyl provided that when one of $R_0$ and $R_1$ is nitro or trifluoromethyl, the other is hydrogen, and $R_2$ is lower alkyl of 1 to 4 carbon atoms, e.g. methyl, ethyl, propyl and the like, and $R_3$ is hydrogen or lower alkyl of 1 to 4 carbon atoms.

The compounds of formula (I) may be prepared by the following reaction scheme:

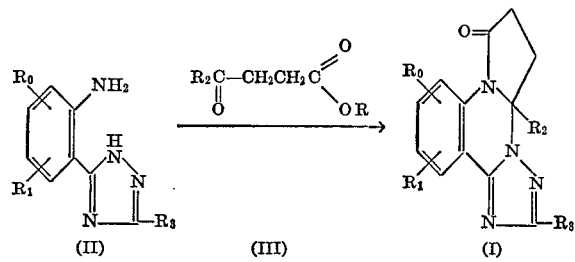

where

R is hydrogen or lower alkyl as defined above and $R_0$, $R_1$, $R_2$, $R_3$ and the proviso are as previously defined.

The compounds of formula (I) are prepared by treating a compound of the formula (II) with a compound of the formula (III) in an inert organic solvent such as the aromatic hydrocarbons, e.g. benzene, toluene and the like, especially benzene. The temperature of the reaction is not critical, but it is preferred that the reaction be run at 50 to 150° C., especially the reflux temperature of the solvent. The reaction is typically run from about 2 to 24 hours. The compounds of formula (I) are recovered using conventional techniques.

Certain of the compounds of formulae (II) and (III) are known and may be prepared by methods disclosed in the literature. The compounds of formulae (II) and (III) not specifically disclosed may be prepared by analogous methods from known starting materials.

The compounds of formula I are useful because they possess pharmacological activity in animals. In particular, the compounds of formula I are useful as anti-inflammatory agents, as indicated by their activity in rats (oral administration 20–150 mg./kg.) using the acute carrageenin-induced edema procedure substantially as described by Winter (Proc. Soc. Exptl. Biol., 111: 544, 1962).

For such use, the compounds may be admixed with conventional pharmaceutical carriers or diluents and administered internally (orally or parenterally) in the form of tablets, capsules, elixirs, solutions, or suspensions. Furthermore, the compounds of formula (I) may also be administered in the form of their non-toxic pharmaceutically acceptable acid addition salts.

Such salts possess the same order of activity as the free base, are readily prepared by reacting the base with an appropriate acid and, accordingly, are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzene-sulfonate and the like.

For the above-mentioned use, the dosage administered will, of course, vary depending upon the compound employed, mode of administration and treatment desired. However, in general, satisfactory results are obtained when the compound is orally administered at a daily dosage of from about 2 milligrams per kilogram of body weight to about 150 milligrams per kilogram of body weight, preferably given in divided doses 2 to 4 times a day or in sustained release form. For most larger mammals, total daily dosage is generally from about 150 milligrams to about 1500 milligrams, and dosage forms suitable for internal administration comprise from about 37.5 milligrams to about 750 milligrams of the compound admixed with a solid or liquid pharmaceutical carrier or diluent.

Pharmaceutical compositions containing said compounds may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents, such as calcium carbonate, sodium carbonate, lactose and talc, granulating and disintegrating agents, e.g. starch and alginic acid, binding agents, e.g., starch, gelatin and anacia, and lubricating agents, e.g., magnesium stearate, stearic acid and talc. The tablets may be uncoated or coated by known techniques to delay disintegration and absorption in the gastro-intestinal tract, if desired. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin.

A representative formulation suitable for oral administration 2 to 4 times a day for the treatment of inflammation is a capsule prepared by standard encapsulating techniques which contain the following:

Ingredients: Weight, mg.
4a,5 - dihydro - 4a - methylpyrrolo-[1,2-a]-s-triazolo[1,5-c]quinazolin-7(6H)-one _____ 100
Inert solid diluent (starch, lactose, kaolin) ____ 200

EXAMPLE I 4a,5-dihydro-4a-methyl-pyrrolo-[1,2-a]-s-triazolo[1,5-c]quinazolin-7(6H)-one A mixture of 4.0 g. of 3-(2'-aminophenyl)-s-triazole and 27.5 g. of laevulinic acid are dissolved in 250 ml. dry benzene and the solution is refluxed with a Dean-Stark trap for 4 hours. Thereafter, more benzene is added to the resulting residue and the benzene solution is washed three times with water, dried over anhydrous sodium sulfate, filtered and removed in vacuo. The resulting residue is crystallized from benzene/ether to give 4a-methyl-pyrrolo-[1,2-a]-s-triazolo[1,5-c]quinazolin - 7(6H) - one m.p. 120–122° C.

Following the above procedure and using in place of 3-(2'-aminophenyl)-s-triazolo an equivalent amount of (a) 3-(2'-amino-5'-chlorophenyl)-s-triazole,
(b) 3-(2'-amino-4',5'-dichlorophenyl)-s-triazole,
(c) 3-(2'-amino-5'-anisyl)-s-triazole,
(d) 3-(2'-amino-5'-chlorophenyl)-1-methyl-s-triazole,
(e) 3-(2'-amino-5'-nitrophenyl)-s-triazole,
(f) 3-(2'-amino-4'-trifluoromethylphenyl)-s-triazole, or
(g) 3-(2'-amino-5'-tolyl)-s-triazole, there is obtained (a) 11-chloro-4a,5-dihydro-4a-methyl-pyrrolo-[1,2-a]-s-triazolo[1,5-c]quinazolin-7(6H)-one, m.p. 159–162° C.
(b) 10,11-dichloro-4a,5-dihydro-4a-methyl-pyrrolo-[1,2-a]-s-triazolo[1,5-c]quinazolin-7(6H)-one.
(c) 4a,5-dihydro-11-methoxy-4a-methyl-pyrrolo-[1,2-a]-s-triazolo[1,5-c]quinazolin-7(6H)-one,
(d) 11-chloro-4a,5-dihydro-2,4a-dimethyl-pyrrolo[1,2-a]-s-triazolo[1,5-c]quinazolin-7(6H)-one, m.p. 195–200° C.,
(e) 4a,5-dihydro-4a-methyl-11-nitro-pyrrolo-[1,2-a]-s-triazolo[1,5-c]quinazolin-7(6H)-one,
(f) 4a,5-dihydro-4a-methyl-10-trifluoromethyl-pyrrolo-[1,2-a]-s-triazolo-[1,5-c]quinazolin-7(6H)-one, or
(g) 4a,5-dihydro-4a,11-dimethyl-pyrrolo-[1,2-a]-s-triazolo[1,5-c]quinazolin-7(6H)-one, respectively.

What is claimed is:
1. A compound of the formula

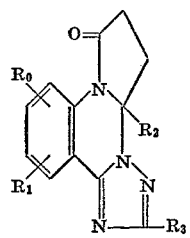

where
$R_0$ and $R_1$ each independently represent hydrogen, halo having an atomic weight of 19 to 36, alkyl of 1 to 4 carbon atoms, alkoxy of 1 to 4 carbon atoms, nitro or trifluoromethyl, provided that when one of $R_1$ and $R_0$ is nitro or trifluoromethyl, the other is hydrogen,
$R_2$ is alkyl of 1 to 4 carbon atoms, and
$R_3$ is hydrogen or alkyl of 1 to 4 carbon atoms, or a pharmaceutically acceptable acid addition salt thereof.

2. A compound of the formula

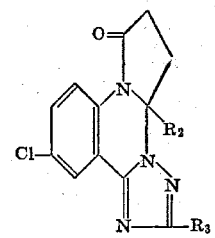

where
$R_2$ and $R_3$ are as defined in claim 1.

3. A compound of the formula

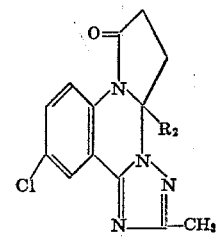

where
$R_2$ is as defined in claim 1.

4. A compound of the formula

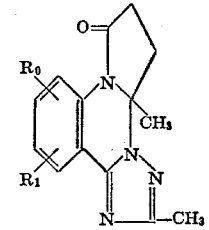

where
$R_0$ and $R_1$ are as defined in claim 1.

5. The compound of claim 1 which is 4a, 5-dihydro-4a-methylpyrrolo-[1,2-a]-s-triazolo[1,5-c]quinazolin-7(6H)-one.

6. The compound of claim 1 which is 11-chloro-4a, 5-dihydro - 4a - methyl-pyrrolo-[1,2 - a]-s-triazolo[1,5-c]quinazolin-7(6H)-one.

7. The compound of claim 1 which is 11-chloro-4a,5-dihydro-2,4a-dimethyl-pyrrolo-[1,2-a] - s - triazolo[1,5-c]quinazolin-7(6H)-one.

8. A process for preparing a compound of claim 1 which comprises the step of reacting a compound of the formula

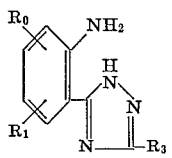

with a compound of the formula

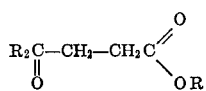

wherein
R is hydrogen or alkyl of 1 to 4 carbon atoms, and
$R_0$, $R_1$, $R_2$ and $R_3$ are as defined in claim 1.

References Cited
UNITED STATES PATENTS
3,150,136   9/1964   Wolfrum, et al. __ 260—256.4 F
FOREIGN PATENTS
780,435   3/1968   Canada _____ 260—256.4 F
OTHER REFERENCES
Kumashiro, "Chemical Abstracts," Vol. 59, 1963, Col. 620h–621d (Abstract of "Nippon Kagaku Zasshi," Vol. 82, 1961, pp. 1068–71).

DONALD G. DAUS, Primary Examiner

J. H. TURNIPSEED, Assistant Examiner